Dec. 20, 1966  L. G. SAWCHUK ETAL  3,293,052
GLASS ARTICLE AND METHOD OF MAKING IT
Filed March 14, 1963
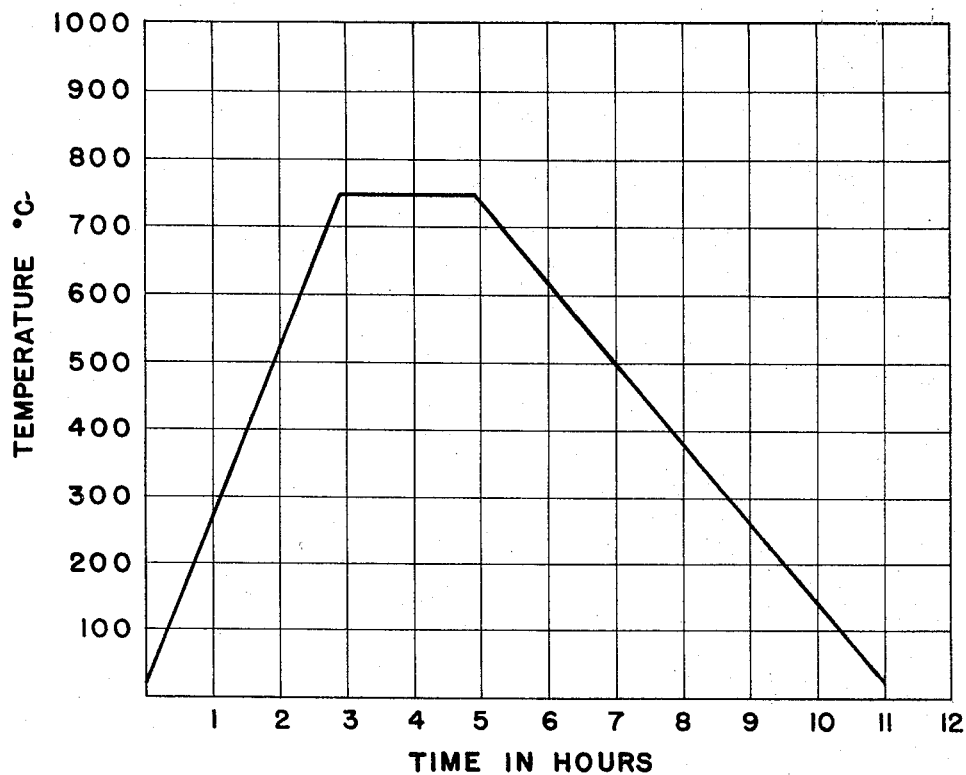
INVENTORS
LORIS G. SAWCHUK
STANLEY D. STOOKEY
BY
ATTORNEY

United States Patent Office 3,293,052
Patented Dec. 20, 1966

3,293,052
GLASS ARTICLE AND METHOD OF MAKING IT
Loris G. Sawchuk and Stanley D. Stookey, Corning, N.Y., assignors to Corning Glass Works, Corning, N.Y., a corporation of New York
Filed Mar. 14, 1963, Ser. No. 265,150
6 Claims. (Cl. 106—54)

This invention relates to the manufacture of glass articles possessing phototropic properties. More particularly, this invention is concerned with the production of glass articles exhibiting phototropicity, i.e., their optical transmittance varies reversible with the intensity of the actinic radiation thereon, where the development of such phototropicity is the result of the presence of molybdenum and/or tungsten in the glass composition.

A rather complete discussion of the theoretical considerations and practical problems involved in the manufacture of phototropic glass articles is presented in the co-pending United States patent application, Serial No. 213,634, filed July 31, 1962, by W. H. Armistead and S. D. Stookey, one of the applicants of the present patent application. Briefly recapitulating the explanation therein, a phototropic glass possesses the inherent characteristic that its optical transmittance varies inversely with the intensity of actinic radiation thereon, this actinic radiation generally comprising exposure to the ultraviolet and visible light components of natural sunlight. These glasses are distinguishable from the photosensitive glasses known to commerce, i.e., glasses which can be darkened by exposure to ultraviolet radiation succeeded by a heat treatment thereof, in the reversibility of their optical transmittance as they are alternately exposed to and then removed from actinic radiation. The reason for this effect is not completely understood and the explanation postulated by Armistead and Stookey, viz., that there is some kind of reaction occurring between the actinic radiation and the submicroscopic crystals which have been caused to be dispersed in the glassy matrix that alters the absorptive characteristics of the crystals upon visible radiation, is adopted herein. The reversibility of optical transmittance is ascribed to the fact that since these radiation-sensitive crystals are dispersed in a glassy matrix the removal of the activating radiation permits the crystals to return to their original state, and, since this matrix is impermeable to and non-reactive with the products formed during such exposure, they cannot diffuse away. Thus, in the usual case, these crystals become darker in hue upon exposure to actinic radiation but regain their original color when the activating radiation is excluded.

Glass possessing phototropic properties has been recommended for use as window panes, automobile windshields, ophthalmic lenses, structural wall panels, and other like applications.

Armistead and Stookey disclosed that silicate glasses of the system $R_2O \cdot B_2O_3 \cdot Al_2O_3 \cdot SiO_2$ where $R_2O$ represents the alkali metal oxides, viz., $Li_2O$, $Na_2O$, $K_2O$, $Rb_2O$, and $Cs_2O$, could be made phototropic through the inclusion of silver and at least one halogen of the group chlorine, bromine, and iodine. The base glasses consist essentially, by weight, of about 40–76% $SiO_2$, 4–26% $Al_2O_3$, 4–26% $B_2O_3$, and at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$. Very minor amounts of low-temperature reducing agents such as tin oxide, iron oxide, copper oxide, arsenic oxide, and antimony oxide may be added to improve the phototropic properties of the glass. Armistead and Stookey also disclosed the possible additions of fluorine, phosphorus pentoxide, and certain bivalent metal oxides such as MgO, CaO, BaO, SrO, ZnO, and PbO. Fluorine is frequently added to the glass batch as a melting aid but its effect on phototropicity of the glass has not been fully resolved as yet. These glasses, as disclosed by Armistead and Stookey, are extremely sensitive to the action of ultraviolet and visible radiation and exhibit exceptional reversibility of optical transmittance when exposed to and removed from such radiation. However, this extreme sensitivity of silver halide-containing glasses to actinic radiation is a drawback in some applications. Thus, the fact that radiation of very low intensity will cause substantial darkening of the glass may be a decided disadvantage can be readily appreciated when it is understood that in many of these glasses the effect of sunlight in the fairly early morning, i.e., around 8:00 a.m., will be substantially the same as caused by sunlight received at high noon. Thus, it can instantly be observed that there is lacking a proportionality of darkening tendency to the intensity of incident radiation. Such proportionality would be extremely desirable in window panes, wall panels, spectacle lenses, and the like where the variability of transmittance of the glass would yield a more uniform distribution of light intensity to a room interior or to the eye. Hence, research has been directed toward the discovery of an activating agent which would would yield a phototropic glass wherein there is good proportionality between the intensity of the incident radiation and the degree of darkening in the glass caused thereby.

Therefore, the principal object of this invention is to provide glass compositions exhibiting phototropic properties wherein the variability of the optical density of the glass is closely dependent upon the intensity of the incident actinic radiation thereon.

Other objects will be apparent from the description of the invention set out hereinbelow and from the accompanying drawing which sets forth a time-temperature graph of a heat treating schedule useful in the invention.

We have discovered that the principal object of this invention can be attained in an article comprising an inorganic silicate glass wherein the inorganic crystals which become darker in color upon exposure to actinic radiation of wave lengths of 3000–5500 A. are composed of silver molybdate, silver tungstate, and mixtures and/or solid solutions thereof. The behavior of these crystals in inducing phototropicity in silicate glasses is similar to that discussed in detail by Armistead and Stookey. The minimum concentration of crystals necessary to produce discernible phototropicity, about 0.005% by volume, is in agreement therewith. Likewise, where the concentration of crystals exceeds about 0.1% by volume and/or the size of the crystals exceeds about 0.1 micron in diameter, a translucent or opalized, rather than a transparent article, is produced.

We have learned that in order to produce the minimum amount of required crystallinity within the ultimate glass structure, silver must be present in an amount of 0.2% by weight as chemically analyzed and the glass must also contain, on an analyzed basis, at least 2.5% total of the oxide of at least one heavy metal of the group consisting of molybdenum and tungsten.

We have further discovered that certain glasses within the system $Na_2O \cdot Al_2O_3 \cdot B_2O_3 \cdot SiO_2$ are particularly suitable in exhibiting phototropicity by means of the inclusion of silver and at least one heavy metal selected from the group consisting of molybdenum and tungsten. Such glasses become darker in color upon exposure to actinic radiation of wave lengths between about 3000–5000 A. (Angstrom Units), i.e., the crystallization developed upon said exposure is sensitive to radiation in the ultraviolet segment of the spectrum and up into about the middle of the visible range. X-ray diffraction analysis of the precipitated crystallization has indicated such to be silver molybdate or silver tungstate. Where mixtures of the metals molybdenum and tungsten are utilized to induce the phototropic behavior, the presence of a silver molybdate-tungstate solid solution is believed to be indicated.

Thus, we have found that a particularly desirable phototropic glass can be produced in a base glass composition consisting essentially, by weight, of about 8–15% $Na_2O$, 7–11% $Al_2O_3$, 10–28% $B_2O_3$, and 44–62% $SiO_2$, the sum of these recited base glass constituents and the components of the silver molybdate and/or tungstate crystals comprising at least about 90% of the total glass composition.

We have further discovered that the addition of very minor amounts of low-temperature reducing agents, generally in amounts less than 1% by weight, may be beneficial in improving the phototropicity of these glasses. Such agents are: tin oxide, computed as SnO; copper oxide, computed as CuO; iron oxide, computed as FeO; arsenic oxide, computed as $As_2O_3$; and antimony oxide, computed as $Sb_2O_3$.

Fluorine and $P_2O_5$ may be added to the glass batch to improve its melting qualities and to inhibit devitrification upon cooling. The effect of fluorine upon the phototropicity of the glass is not completely known but the amount utilized is kept low in order to forestall the precipitation of fluorides within the glass. The $P_2O_5$ content is also held low so that its action as an oxidizing agent will be minimized.

The inclusion of the bivalent metal oxides should be limited to not more than about 4% MgO, 6% CaO, 7% SrO, 8% BaO, 8% ZnO, and 8% PbO, on a weight basis, the total amount of these bivalent metal oxides not exceeding 10%, by weight, of the glass composition.

The constituents of the base glass, i.e., the $Na_2O$, $Al_2O_3$, $B_2O_3$, and $SiO_2$, are preferably maintained within the ranges set forth hereinabove to assure the production of a glass possessing good phototropic and other physical properties. Where the silica content is less than about 44%, there is sometimes a tendency for undesirable crystalline phases to precipitate along with the molybdates and tungstates. In batches where the silica content is in excess of about 62% or the minimum amount of $Na_2O$ is absent, the glass is very difficult to melt satisfactorily at conventional melting temperatures. Where the amount of $B_2O_3$ exceeds about 28% or the $Na_2O$ content is greater than about 15%, the glass is subject to chemical attack or weathering. At least 10% $B_2O_3$ must be present in the glass to secure the precipitation of the desired silver molybdate and/or tungstate crystals. $Al_2O_3$ must be present within the aforementioned range in order to insure the absence of undesirable glassy or crystalline phases which must form with, or in preference to, the silver molybdates and tungstates.

The production of the phototropic articles of this invention contemplates melting together the components of the desired crystalline phase with the components of the base glass and thereafter precipitating said crystals in situ in a glassy matrix. Thus, glasses of the desired composition may be obtained in accordance with conventional glass practice by melting the required batch in a crucible, pot, or tank. Thereafter, the melt is cooled and a glass shape of the desired configuration formed therefrom employing any of the conventional glass-forming techniques such as blowing, casting, drawing, pressing, rolling, etc., and then cooled to room temperature, this cooling step frequently being supplemented with an annealing step. The radiation-sensitive crystals can be precipitated upon cooling the melting to a glass body. However, the crystals produced thereby are often nonhomogeneous and of nonuniform size. Therefore, the preferred method comprises cooling the glass to at least below its annealing point (475°–525° C.) at so rapid a rate that no crystallites of the proper size, or at least an insufficient number thereof, are precipitated to cause a discernible phototropic effect in the glass. Following this quick cooling step, the glass shape is subjected to a special heat treatment by means of which the precipitation of submicroscopic crystals can be closely controlled both as to homogeneity and size. The most effective crystal size appears to range from about 40–200 A. This heat treatment consists of exposing the glass shape to a temperature above the strain point of the glass (425°–475° C.) for a time sufficient to attain the desired crystallization therein such that the shape will demonstrate satisfactory phototropicity. This heat treatment normally comprises heating the glass shape to a temperature of about 500°–900° C. for a period of time ranging from as little as about ½ hour at 900° C. to as long as 24 hours at 500° C. It is believed that the heat treatment permits the rearrangement of the silver cations and the molybdate and tungstate anions thereby developing a separate crystalline phase of the desired silver salt within the glass matrix. This rearrangement will occur more readily at higher temperatures, principally because the viscosity of the glassy matrix decreases with an increase in temperature, thereby lessening the resistance to movement necessary in furthering the rearrangement. Hence, a much shorter heating period at the higher temperatures will involve comparable rearrangement as a long period at a lower temperature. Nevertheless, as there are other possible reactions which can occur during the heat treatment such as agglomeration and precipitation of other crystalline phases, the heat treatment at the higher extreme of the operable range must be of limited duration to preclude such undesirable secondary reactions. After heat treatment, the article is cooled to room temperature, preferably in a controlled manner such that the glass is annealed.

Table I sets forth examples having compositions falling within the prescribed ranges as analyzed on the oxide basis in weight percent. The batch constituents may consist of any materials, either oxides or other compounds, which, on being fused together, are transformed to the desired oxide compositions in the necessary proportions.

In accordance with conventional analytical practice, although it has been determined that a substantial portion, if not all, of the silver is present in the glass as ions thereof probably having bonds with oxygen and/or the molybdate and tungstate ions, and not as metallic silver, it is expressed in Table I as silver. The glasses outlined in Table I can be melted from batches in the conventional manner but allowance must be provided for volatilization of silver, this loss being, perhaps, as high as 30% depending upon the melting unit and temperatures employed.

TABLE I

|   | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 58.0 | 55.2 | 55.2 | 52.6 | 52.6 | 53.0 | 55.2 | 55.2 | 55.2 | 55.2 | 55.2 | 45.0 | 45.0 | 56.0 | 57.0 |
| $Al_2O_3$ | 9.6 | 9.1 | 9.1 | 8.6 | 8.6 | 9.9 | 9.1 | 9.1 | 9.1 | 9.1 | 9.1 | 9.1 | 9.1 | 9.1 | 9.1 |
| $B_2O_3$ | 19.4 | 19.0 | 19.0 | 18.6 | 18.6 | 19.8 | 19.0 | 19.0 | 16.0 | 14.5 | 13.0 | 27.0 | 14.5 | 14.5 | 14.5 |
| $Na_2O$ | 9.6 | 9.1 | 9.1 | 8.6 | 8.6 | 9.9 | 9.1 | 9.1 | 11.0 | 12.7 | 14.5 | 9.1 | 12.7 | 12.7 | 12.7 |
| $WO_3$ |  | 6.3 | 6.3 | 9.0 | 9.0 | 3.4 | 6.3 | 6.3 | 6.3 | 6.3 | 6.3 | 6.3 | 6.3 | 5.4 | 4.5 |
| $MoO_3$ | 3.2 |  |  |  |  | 3.2 |  |  |  |  |  |  |  |  |  |
| Ag | 0.36 | 0.60 | 0.76 | 0.41 | 0.58 | 0.36 | 0.66 | 0.66 | 0.66 | 0.66 | 0.66 | 0.66 | 0.66 | 0.66 | 0.66 |
| CuO |  |  |  |  |  |  |  | 0.016 |  |  |  |  |  |  |  |

|   | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| $SiO_2$ | 58.0 | 58.0 | 58.0 | 58.0 | 58.0 | 50.0 | 55.2 | 55.2 | 55.2 | 58.0 | 58.0 | 53.0 | 58.0 | 58.0 |
| $Al_2O_3$ | 9.1 | 9.1 | 9.1 | 9.1 | 9.1 | 9.1 | 9.1 | 9.1 | 9.1 | 9.6 | 9.6 | 8.7 | 9.6 | 9.6 |
| $B_2O_3$ | 14.5 | 14.5 | 14.5 | 14.5 | 13.0 | 12.0 | 19.0 | 19.0 | 19.0 | 19.4 | 19.4 | 18.4 | 19.4 | 19.4 |
| $Na_2O$ | 12.7 | 12.7 | 12.7 | 12.7 | 14.5 | 13.0 | 9.1 | 9.1 | 9.1 | 9.6 | 9.6 | 8.7 | 9.6 | 9.6 |
| $WO_3$ | 3.6 | 3.6 | 3.6 | 3.6 | 3.6 | 3.2 | 6.3 | 6.3 | 6.3 |  |  | 6.3 |  |  |
| $MoO_3$ |  |  |  |  |  |  |  |  |  | 3.2 | 3.2 | 3.2 | 3.2 | 3.2 |
| Ag | 0.66 | 0.54 | 0.45 | 0.36 | 0.66 | 0.60 | 0.66 | 0.54 | 0.45 | 0.45 | 0.36 | 0.54 | 0.36 | 0.27 |

The glasses recorded in Table I were obtained by compounding conventional batch ingredients in suitable proportions to produce the desired glass composition (making allowance for the volatilization of silver), ball milling these ingredients to insure a homogeneous melt, and then melting the batch at a temperature of 1350°–1400° C. for about 6 hours. The melts were then poured and rolled into plates, these plates being annealed at about 500° C. In each instance, the plates were cooled to room temperature for visual inspection and testing for phototropicity. In all cases, the rapidity of cooling occasioned by the rolling into plates was adequate to preclude the development of sufficient crystallization to cause any appreciable phototropicity. The plates were then heat treated to promote a controlled growth of radiation-sensitive crystals. It will be appreciated, however, that the glass article need not be cooled to room temperature prior to heat treatment but may merely be cooled to the transformation point of the glass, i.e., that temperature at which the melt is deemed to have become an amorphous solid, and then subjected to heat treatment. It will be realized further, of course, that in most instances the maximum heat treating temperature which will be utilized with a particular glass will not exceed the temperature at which excessive thermal deformation occurs. However, it will be understood that some forming methods inherently contemplate a thermal deformation of the glass body and here, perhaps, the heat treating step could be incorporated therewith.

Table II sets forth the heat treating temperatures utilized in developing phototropicity in the glasses described in Table I. The heating rate employed in bringing the glass article from room temperature to the heat treating temperature does not appear to have a critical effect on the results. The bodies may be plunged directly into a furnace set at the desired heat treating temperature, if the size and shape of the piece is such that breakage due to thermal shock does not occur, or they may be heated at substantially any rate. Likewise, the articles may be cooled at substantially any rate as long as they are not damaged through thermal shock or produce undesirable residual stresses. In Examples 1–5 and 12–27, the glass plates were plunged into a furnace, held thereat for a time sufficient to precipitate submicroscopic crystals of radiation-sensitive material, and then removed from the furnace and allowed to cool to room temperature in the ambient atmosphere. The remaining glass plates were placed in a furnace, heated at about 5° C./minute to the desired temperature, held thereat for a time sufficient to precipitate submicroscopic crystals of radiation-sensitive material, and then the heat was cut off and the furnace allowed to cool at its own rate with the plates retained therein.

*Table II*

| Example No.: | Heat treatment |
|---|---|
| 1 | 800° C. for 2 hours |
| 2 | 800° C. for 2 hours |
| 3 | 800° C. for 2 hours |
| 4 | 800° C. for 2 hours |
| 5 | 800° C. for 2 hours |
| 6 | 650° C. for 16 hours |
| 7 | 650° C. for 16 hours |
| 8 | 750° C. for 2 hours |
| 9 | 750° C. for 2 hours |
| 10 | 750° C. for 2 hours |
| 11 | 750° C. for 2 hours |
| 12 | 750° C. for 2 hours |
| 13 | 750° C. for 2 hours |
| 14 | 750° C. for 2 hours |
| 15 | 750° C. for 2 hours |
| 16 | 750° C. for 2 hours |
| 17 | 750° C. for 2 hours |
| 18 | 750° C. for 2 hours |
| 19 | 750° C. for 2 hours |
| 20 | 750° C. for 1 hour |
| 21 | 750° C. for 1 hour |
| 22 | 750° C. for 1 hour |
| 23 | 750° C. for 1 hour |
| 24 | 750° C. for 1 hour |
| 25 | 750° C. for 1 hour |
| 26 | 750° C. for 2 hours |
| 27 | 750° C. for 2 hours |

Table I illustrates the variations in base glass composition which can be made phototropic through the inclusion of silver and the molybdate and/or tungstate ion. The Table also demonstrates the workable amounts of radiation-sensitive ingredients which are needed in these base glasses. The quantity of activating agents which is operable in this invention is limited by two factors. Obviously, a certain minimum amount must be present to develop sufficient crystallization to cause phototropicity. The maximum which can be tolerated is based upon the solubility of these agents in the glass. It is apparent from the Table that the amount of molybdate and/or tungstate ions which can be present may be in excess of heat required to combine stoichiometrically with the silver. However, laboratory testing has shown that at above about 0.8% silver and above about 10% molybdenum or tungsten oxide, excessive precipitation occurs during the quenching step such that the glass becomes inhomogeneous. Some precipitation can be tolerated in the form of a translucent or opalized phototropic glass but excessive precipitation dampens the development of submicroscopic radiation-sensitive crystals through subsequent heat treatment. As noted previously, phototropic behavior is based upon the presence of crystals of radiation-sensitive material of a rather specific size, the preferred range being about 40–200 A.

The accompanying drawing sets forth a time-temperature graph for the heat treatment of our preferred composition, Example 8, this heat treatment representing our preferred practice. Thus, after melting the batch, simultaneously shaping an article therefrom and cooling to room temperature, the article is placed in a furnace and heated at 5° C./minute to 750° C., held thereat for two hours, the heat to the furnace thereafter cut off and the furnace allowed to cool at its own rate (approximately 2° C./minute) with the article retained therein.

What is claimed is:

1. A phototropic article comprising a body of a silicate glass having in at least a portion thereof crystals of at least one silver compound selected from the group consisting of silver molybdate, silver tungstate, and silver molybdate-tungstate solid solution, said portion of the glass containing, by weight on the analyzed basis, about 0.2–0.8% silver and 2.5–10% total of the oxide of at least one heavy metal selected from the group consisting of molybdenum and tungsten.

2. A glass composition which is potentially phototropic consisting essentially, in weight percent on the analyzed basis, of 8–15% $Na_2O$, 7–11% $Al_2O_3$, 10–28% $B_2O_3$, 44–62% $SiO_2$, 0.2–0.8% silver, and 2.5–10% total of the oxide of at least one heavy metal selected from the group consisting of molybdenum and tungsten, the sum of the recited base glass constituents, silver, and heavy metals being a least 90% of the total glass composition.

3. A method of manufacturing a phototropic glass body which comprises the steps of melting a batch for a silicate glass composition, said batch containing 0.2–0.8% by weight of silver on an analyzed basis and 2.5–10% by weight, total of the oxide of at least one heavy metal selected from the group consisting of molybdenum and tungsten, simultaneously cooling the melt and forming a glass article therefrom, subsequently heat treating said glass article at a temperature above the strain point of the glass for a time sufficient to precipitate submicroscopic crystals of radiation-sensitive material, and then cooling said article to room temperature.

4. The method according to claim 3 wherein the submicroscopic crystals of radiation-sensitive material consist of at least one silver compound selected from the group consisting of silver molybdate, silver tungstate, and silver molybdate-tunstate solid solution.

5. The method according to claim 3 wherein the temperature of heat treatment ranges from about 500° to 900° C.

6. The method according to claim 5 wherein the time sufficient to precipitate submicroscopic crystals of radiation-sensitive material ranges from about 0.5 hour at 900° C. to about 24 hours at 500° C.

References Cited by the Examiner
UNITED STATES PATENTS 2,704,420 10/1955 Ohlinger _____ 106—150
3,208,860 9/1965 Armistead et al. _____ 196—52

HELEN M. McCARTHY, *Acting Primary Examiner.*